United States Patent
Patrick

(10) Patent No.: US 8,786,489 B2
(45) Date of Patent: Jul. 22, 2014

(54) ACTIVE TARGET WITH HEIGHT DIVERSITY

(75) Inventor: David E. Patrick, Bedfordshire (GB)

(73) Assignee: Guidance IP Limited, Leicester (GB)

( * ) Notice: Subject to any disclaimer, the term of this patent is extended or adjusted under 35 U.S.C. 154(b) by 465 days.

(21) Appl. No.: 13/070,109

(22) Filed: Mar. 23, 2011

(65) Prior Publication Data

US 2011/0234445 A1  Sep. 29, 2011

(30) Foreign Application Priority Data

Mar. 25, 2010 (GB) .................................. 1004995.5

(51) Int. Cl.
*G01S 13/42* (2006.01)

(52) U.S. Cl.
USPC .............. 342/44; 342/133; 342/140; 342/146

(58) Field of Classification Search
USPC ........... 342/44, 127, 133, 139, 140, 146, 147, 342/417, 446
See application file for complete search history.

(56) References Cited

U.S. PATENT DOCUMENTS

| | | | |
|---|---|---|---|
| 4,109,247 A | 8/1978 | Kaplan | |
| 4,333,078 A | 6/1982 | Henoch et al. | |
| 4,806,932 A | 2/1989 | Bechtel | |
| 4,806,938 A * | 2/1989 | Meadows | 342/370 |
| 5,164,734 A | 11/1992 | Fredericks et al. | |
| 5,254,997 A | 10/1993 | Cohn | |
| 5,847,675 A * | 12/1998 | Poinsard | 342/81 |
| 6,060,815 A * | 5/2000 | Nysen | 310/318 |
| 6,064,320 A | 5/2000 | d'Hont et al. | |
| 6,100,840 A | 8/2000 | Zidek et al. | |
| 6,225,943 B1 * | 5/2001 | Curley et al. | 342/137 |
| 6,420,996 B1 | 7/2002 | Stopczynski et al. | |
| 6,469,654 B1 | 10/2002 | Winner et al. | |
| 7,272,472 B1 | 9/2007 | McElreath | |
| 2006/0022866 A1 * | 2/2006 | Walton et al. | 342/194 |
| 2006/0044179 A1 | 3/2006 | Fossum | |
| 2006/0044183 A1 | 3/2006 | Wells | |
| 2006/0132303 A1 * | 6/2006 | Stilp | 340/539.22 |
| 2006/0208947 A1 | 9/2006 | Tsuchihashi et al. | |
| 2009/0179799 A1 | 7/2009 | Kawasaki | |

FOREIGN PATENT DOCUMENTS

| | | |
|---|---|---|
| EP | 0288035 A2 | 10/1988 |
| EP | 2177930 A1 | 4/2010 |
| GB | 2051522 A | 1/1981 |
| GB | 2064257 A | 6/1981 |
| GB | 2284323 A | 5/1995 |
| GB | 2405277 A | 2/2005 |
| JP | 54-25194 | 2/1979 |
| JP | 55-018986 A | 2/1980 |

(Continued)

OTHER PUBLICATIONS

European Search Report and Opinion for European Patent Application No. EP11157680.7, dated Jul. 22, 2011, 7 pages.

(Continued)

*Primary Examiner* — John B Sotomayor
(74) *Attorney, Agent, or Firm* — Goodwin Procter LLP

(57) ABSTRACT

An active radar target includes several receive antennas and several transmit antennas that are arrangeable into pairs of antennas. Each pair includes a transmit and a receive antenna. At least one antenna in a pair is at a different height relative to at least one other antenna in a different pair of antennas.

14 Claims, 10 Drawing Sheets

(56) References Cited

FOREIGN PATENT DOCUMENTS

| JP | 2-044275 A | 2/1990 |
|---|---|---|
| WO | WO-99/61937 A1 | 12/1999 |
| WO | WO-01/16554 A2 | 3/2001 |
| WO | WO-01/86229 | 11/2001 |

OTHER PUBLICATIONS

Examination Report for United Kingdom Patent Application No. GB1004989.8, mailed Jul. 19, 2010, 2 pages.
Search Report for United Kingdom Patent Application No. GB1004989.8, mailed Jul. 15, 2010, 1 page.
Examination Report for United Kingdom Patent Application No. GB1004995.5, dated Jul. 23, 2010, 2 pages.
Search Report for United Kingdom Patent Application No. GB1004995.5, dated Jul. 22, 2010, 2 pages.
Examination Report for United Kingdom Application No. GB1004964.1, dated Jul. 13, 2010, 3 pages.
Search Report for United Kingdom Application No. GB1004964.1, dated Jul. 12, 2010, 2 pages.
European Search Report and Opinion for European Patent Application No. EP11157900, dated Jul. 14, 2011, 7 pages.
European Search Report and Opinion for European Patent Application No. EP11157390, dated Jul. 15, 2011, 5 pages.

* cited by examiner

ACTIVE TARGET WITH HEIGHT DIVERSITY

CROSS REFERENCE TO RELATED APPLICATION

This application claims priority to and the benefit of United Kingdom Patent Application No. GB1004995.5, filed Mar. 25, 2010, the entire disclosure of which is incorporated herein by reference in its entirety.

FIELD OF THE INVENTION

The present invention relates to an active radar target with height diversity

BACKGROUND TO THE INVENTION

Radar can be used to measure range and direction to a reflective object, which is often referred to as a "target". However, a return may be achieved from all possible reflecting surfaces, which in the case of a large structure such as a ship or oil rig can give a large return signal, of extended angular range and a range of distances. This is generally acceptable for standard collision avoidance applications.

However such diverse returns of the radar signal are not useful if it is desired to use radar to measure distance to a target, such as a vessel position relative to an oil rig, to a few meters or less.

It is known to provide active radar reflectors. An example of such a reflector is the "See me" (trademark) radar target enhancer which detects when a vessel carrying the target enhancer is illuminated by a radar system. It amplifies the incoming signal and retransmits it, and in so doing synthesises a radar cross section of around 34 square meters.

However a signal propagating between a radar and an active target may be able to propagate by several signal paths. A particularly problematic scenario is where part of the signal undergoes "line of sight", i.e. direct, propagation and another part of the signal undergoes reflection, for example from the surface of the sea. These two signal paths can interfere, either constructively or destructively depending on the relative path lengths. For X band radar the wavelength of the radar is around 3 cm or so and consequently rolling of a ship carrying the target and/or wave height and position variations can give rise to short periods of destructive interference.

SUMMARY OF THE INVENTION

According to a first aspect of the present invention there is provided an active radar target comprising a plurality of receive antennas and a plurality of transmit antennas arrangeable into pairs of transmit and receive antennas with at least one antenna in a pair being vertically displaced with respect to at least one antenna in a different pair of antennas, and further comprising at least one amplifier and a modulator arranged to amplify and modulate an incoming signal prior to retransmitting it.

Advantageously the retransmitted signal is frequency shifted by a mixer or modulator so as to reduce the risk of self sustaining oscillation. Advantageously the modulation scheme substantially reduces the energy component at the frequency of the incoming radar frequency. A suitable modulation scheme is a single sideband suppressed carrier modulation scheme. Where a modulator or mixer is provided to modify the amplitude, frequency or phase of the signal that is provided to the transmit antenna for retransmission, then the returned signal may further be modulated so as to carry a data payload for return to the radar system.

An identity code may, for example, be associated with the active radar target, and hence may be stored in a memory within the target. However, the identity code might relate to another item, such as a bracket or other structure on part of a further structure, such as a ship or an oil rig, and the identity code may be read by the active target or entered into the active target when the active target is being positioned. The means for receiving the identity code may comprise a keyboard, but other items such as bar code readers, RF tags or near field readers might be used when a RF or other memory tag is attached to the bracket or structure. Alternatively, where the active target includes a data input for receiving data from other devices, the identity may be sent to the active target via the data input.

Preferably the modulator is a single sideband suppressed carrier (SSBSC) modulator. This is known to be efficient as signal power is not wasted on a carrier, which consumes power but conveys little information—except from identifying the presence of the carrier. However, in the context of the present invention and ranging systems using an active target constituting an embodiment of the present invention, the SSBSC modulation conveys additional advantages.

Advantageously a frequency shift keying (FSK) scheme is employed to encode a digital word or words conveying at least the identity. FSK has the advantage that the radar signal is modulated in a form that is quite easy to detect, and which exists irrespective of the value of the data payload. This is to be compared with, for example, AM modulation where "1" might represent returning 90% of the transmit power and a "0" might represent returning 10% of the transmit power of the amplified signal. In such a scheme it becomes difficult to distinguish between a low signal return strength because the signal is encoding a "0" and low signal return because of multi-path destructive interference. Other modulation schemes, such as phase shift keying, PSK, might equally be employed to encode the identity signal. PSK provides similar advantages to FSK modulation.

Preferably the identity or data payload is retransmitted periodically whilst the active target is illuminated by a radar signal above a predetermined intensity. Thus if for example the active target is powered by one or more batteries, then it can de-power into a resting state when not illuminated by a radar and hence conserve battery life.

Advantageously the active target can transmit additional data back to a suitable radar system such that additional data in excess of the identity, which may be the identity of the active target, can be provided to the radar system. Such additional data may be provided by an external or internal data source. Data may include GPS position, vessel speed, vessel heading, sea state parameters, data from strain gauges or other external devices, and so on. Such external data may be transmitted to the active target wirelessly or sent over a databus. Similarly the identity may be provided to the active target wirelessly or via a databus.

The target may also include internal sensors for detecting the direction of the incoming radar with respect to a reference direction. The reference direction may be defined by the shape of the target. Thus, if the target has a planar surface or some other direction defining the "front" of the target, then the direction of illumination may be measured with respect to the front. For embodiments which operate in a roughly 2D space, i.e. at fixed height with respect to the earth or sea, then a measured azimuth is generally sufficient.

In a preferred embodiment the active target includes means for providing signal path diversity.

According to a second aspect of the present invention there is provided a radar system comprising a radar transmitter and receiver adapted to co-operate with an active radar target according to the first aspect of the present invention so as to extract a data payload from a signal returned by the active target.

BRIEF DESCRIPTION OF THE DRAWINGS

The present invention will now be described, by way of example only, with reference to the accompanying Figures, in which.

DESCRIPTION OF PREFERRED EMBODIMENTS

Figure 1:
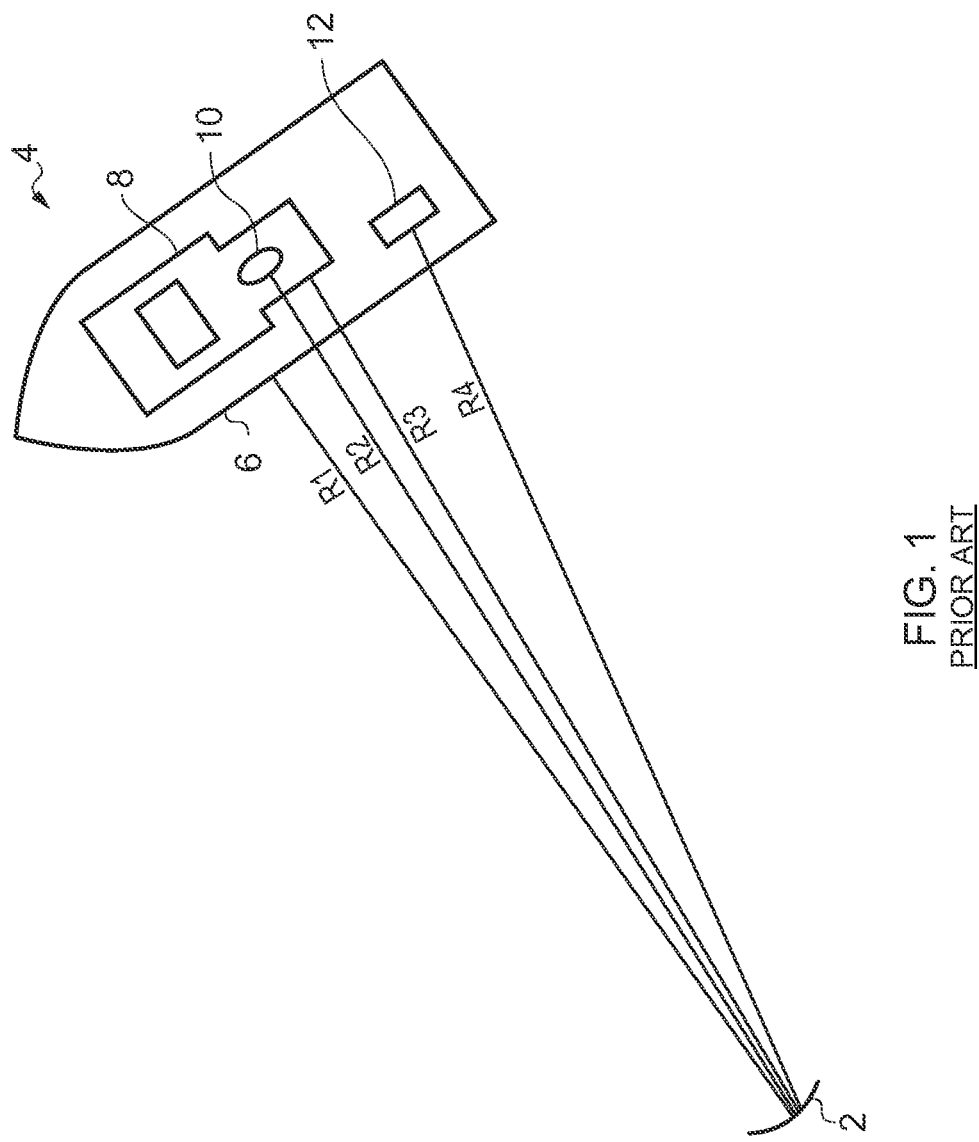
FIG. 1 schematically illustrates a vessel illuminated by a radar and a plurality of radar returns R1 to R4 which may result, each having a different range from the radar antenna.

As noted hereinbefore, it can be difficult to obtain a very precise radar range to a complex target. FIG. 1 illustrates a situation where a radar, schematically represented by a parabolic dish 2 (although no inference should be taken from this as the invention is equally suitable for use with arrays of antennas operable to form beam steered arrays) which transmits a radar signal that illuminates a complex target 4, such as a large ship. The ship has a hull 6, a superstructure 8, a funnel 10 and an item of cargo 12. Each of these items may give a radar return, and as shown each reflecting item has a slightly different distance R1 to R4 respectively from the radar 2.

This is not a problem if one merely wishes to know that the ship is there and to get a rough distance to it, e.g. 1.5 nautical miles (1 nautical mile=1854 m).

However, some navigation, such as pipe laying and oil rig positioning requires the distance between objects to be measured to around 1 meter or less.

Frequency modulated continuous wave (FMCW) is a known technique which can achieve measurements to within this required accuracy. This technique has the advantage over pulsed radar techniques in that the target can be continuously illuminated by the radio frequency energy of the radar, thereby allowing additional signal and data processing techniques to be used in conjunction with the radar ranging.

Figure 2A:
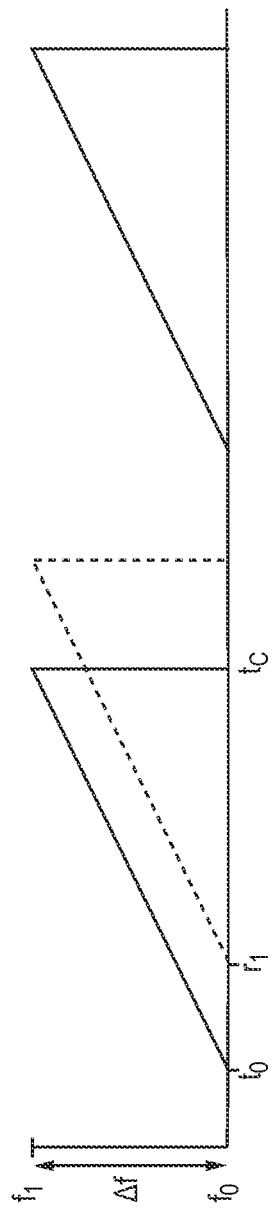
FIGS. 2a and 2b schematically illustrate how a chirped radar signal can provide very accurate distance and relative speed data.
Figure 2B:
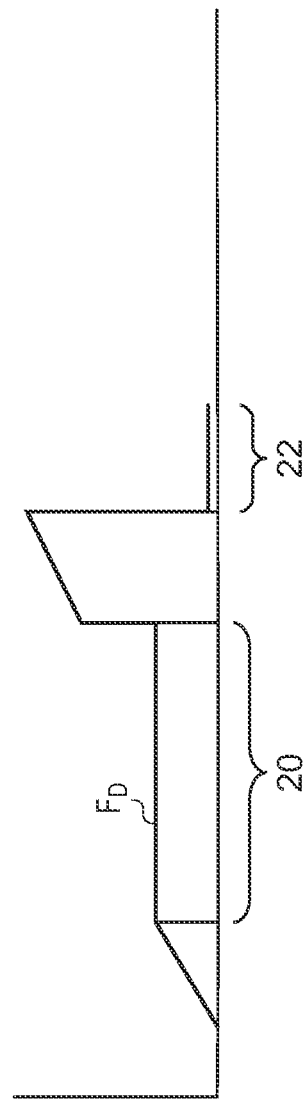

Although FMCW is known, its basic principles will be briefly discussed for completeness, with respect to FIGS. 2a and 2b. FMCW is often driven with a triangle frequency change waveform. However, for convenience, and to demonstrate the power of this technique, we will consider a simplified example where the radar is modulated with a saw-tooth chirp, and a gap exists between each chirp.

The radar frequency is frequency modulated such that it starts at frequency $f_0$ at time $t_o$ and then increases at a known rate up to a maximum frequency $f_1$ at time $t_c$. This is generally known as a 'chirp' and the chirp extends from $t_o$ to $t_c$, and is illustrated in FIG. 2a.

Now suppose at time $t_0$ the radar is illuminating a target. At time $t_0$ the radio signal having a frequency $f_0$ exits the radar antenna, and then travels to the target, is reflected and returns. The journey takes a round trip travel time such that at time $r_1$ the signal, having a frequency $f_0$ is received at the radar.

In the meantime the radar frequency has been changing with the chirp, at a rate $\Delta f/T_c$. The difference between the instantaneous transmission frequency and the instantaneous return frequency is proportional to the journey time of the radar signal to the target and back. These frequencies can be mixed together by a mixer and produce a down converted beat frequency $F_b$ that is proportional to the distance to the target, and as illustrated in FIG. 2b.

In fact, ignoring all other factors, such as Doppler shift $$\text{Range} = \frac{F_b \times C \times T}{2 \times \Delta F}$$

where
C=speed of light
$T=t_c-t_0$
$\Delta f=f_1-f_0$

It can be seen that in this example, apart from the time period 20 where the beat frequency is nominally constant and is a function of the distance to the target, there is also another period 22 where the transmit and return frequencies are nominally the same, so any frequency shift here is a Doppler shift allowing relative velocities to be identified.

Of course, with multiple reflections occurring there is still the potential for several return frequencies, rather than the monotone $F_b$ described here.

In order to facilitate ranging, an active target can be used, but to distinguish itself from the background, the active target needs to stand out, and it can do this by transmitting a modified signal.

The modified signal may be modified by one or more of
transmitting an identity signal
a distinctive modulation scheme
transmitting other data—such that the signal could not be a "simple" radar reflection.

It is useful to consider these approaches in turn.
Transmitting an Identity

Each active target may be given an identity code that it uses to modulate the returning signal such that the target can be identified from other returns to the radar system.

Simplistic schemes might include a periodic amplitude modulation (as might be achieved by a rotating reflector being covered and uncovered) or a periodic frequency shift, as could also be achieved by a rotating reflector giving a doppler shift. However these schemes are inflexible and rely on rotating mechanical parts.

In a preferred embodiment, a digital identity code is used to modulate the return signal. A particularly useful approach is to amplitude modulate the returning radar signal, with the modulation occurring at frequencies $M_1$ and $M_0$ to represent digital "$1_s$," and "$0_s$," respectively of a digital word. This is also known as binary frequency shift keying. However, a greater number of frequencies could be used to transmit more complex symbols, thereby increasing the information content for a given symbol rate.

Thus a modulation is always returned, irrespective of the digital word or words, but the digital signal can also convey a target identity, and also other data.

Figure 3:
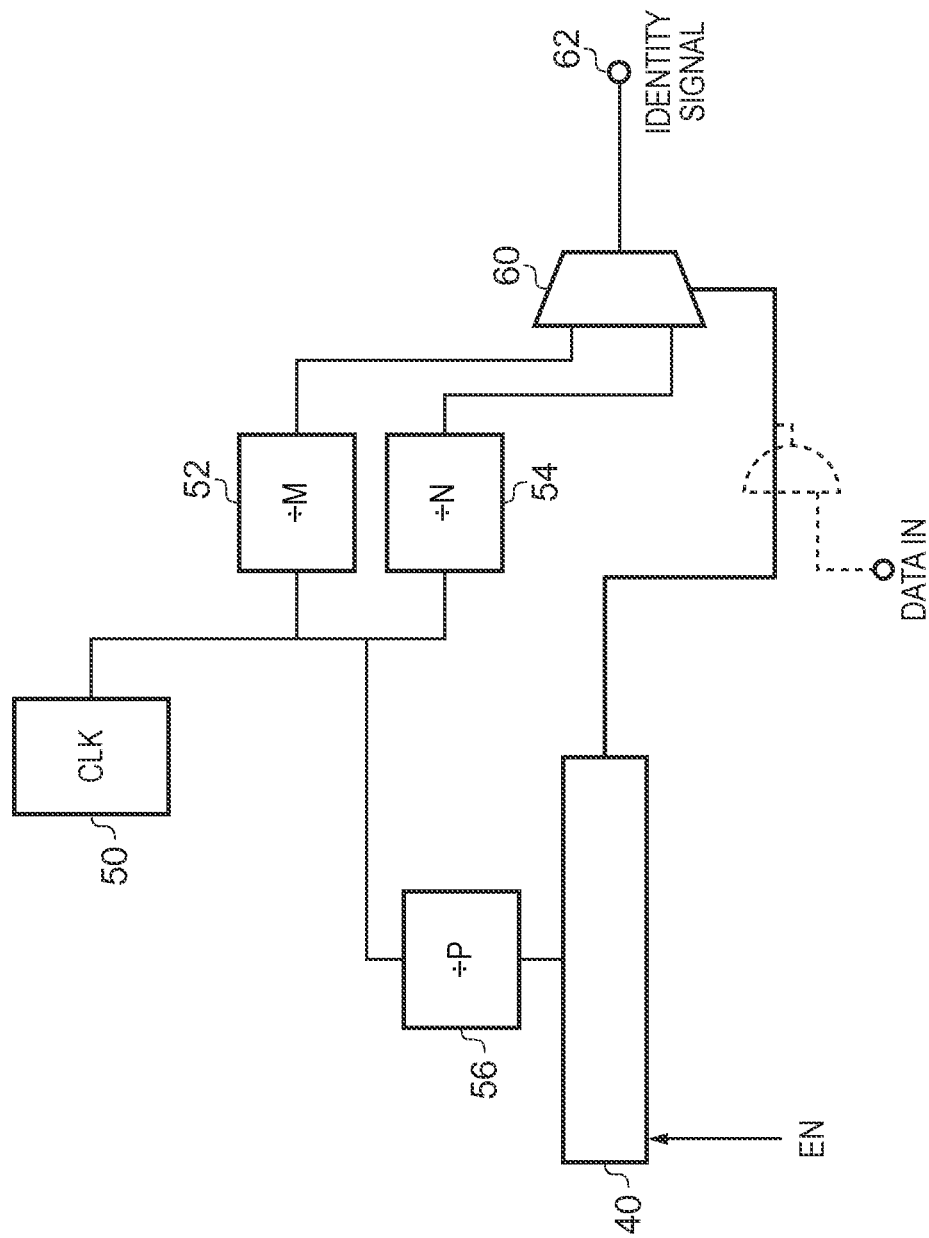
FIG. 3 schematically illustrates a circuit for reading an identity code from a memory and producing a baseband frequency shift keyed signal.

In an exemplary embodiment modulation frequencies of 1.75 MHz and 2.25 MHz are chosen to represent the digital 1's and 0's. FIG. 3 illustrates a simple circuit to read out an identity from a memory, such as a shift register 40 that gets reset to a predetermined bit pattern representing the identity.

A clock 50 provides a timing and frequency reference. The clock has an output that is provided as an input to dividers 52, 54 and 56 dividing by M, N and P respectively. Outputs of the dividers 52 and 54 are provided to respective inputs of a 2 channel multiplexer, which has a selection input connected to an output of the shift register 40.

If, for example, the clock runs at 15.75 MHz, then if M=9, the output of divider 52 is a 1.75 MHz signal and in N=7 then the output of the divider 54 is a 2.25 MHz signal.

If P is much larger than 7 or 9, say 128, then a digital word represented by 1.75 or 2.25 MHz modulation patterns can be transmitted at reasonable data rates, i.e. over 100 Kbits per second.

Once the register 40 is enabled, it successively clocks out the target identity, and the pattern of 1's and 0's is used by the multiplexer to select the correct frequency to be output at node 62.

If it is desired to add further data after transmission of the identity signal then it is easy to modify the circuit to pass the signal from the register 40 via an AND gate as shown in the outline, and to arrange the register to repeatedly output an "1" after the identity has been transmitted.

Thus the AND gate can receive a 1 at its second input whilst the identity is being transmitted, and then subsequently one or more data words that are to be transmitted to convey other information. The sequence is repeated automatically.

The register could have its initial values hard wired, or they could be set by a keyboard, switches, or via any other suitable arrangement. Where a keyboard or switches are used to set the identity then the identity can be that a mounted bracket or similar whose position on a structure is well determined.

A mounting bracket may carry mechanical protrusions, or galvanic connections which allow the identity of the mounting bracket to be passed to the active target when the target is attached to the bracket. The bracket might, in some embodiments, carry a near field memory device, such as an RF ID tag, which contains the identity information, and which is read by the active target. Similarly the active target may include a slot to accept a memory card or USB stick to provide identity information, or it may receive it from a non-contacting memory, or via a data connection from a further device.

The invention has been described in the context of a frequency shift keying modulation scheme. However other schemes, such as phase shift keying could also be used to indicate the identity and/or to convey other information. For example, rather than using two frequencies to indicate a "0" or a "1", a single frequency could be used, 2.25 MHz for example, and a "0" may be represented by a phase change of zero degrees and a "1" may be represented by a phase change of 180°. In such a system a preamble might be included such that the receiver could identify the preamble, which is a known bit sequence, to recover the phases correctly.

Modulating the Return Signal with the Identity

The simplest approach to returning the signal would be simple amplitude modulation of the radar signal. However this is a poor approach as a significant amount of the transmit power would be in the carrier frequency, and as this is identical to the frequency used to illuminate the target, then oscillation may result. The need to avoid oscillation would require the use of only a low gain amplifier, and probably physically separate and widely spaced apart receive and transmit antennas. This is at odds with the requirement to provide a relatively discrete physical target so as to achieve the desired range discrimination of 1 meter or less.

The inventors realised that the oscillation risk could be much reduced by offsetting the returned data from the carrier frequency and/or suppressing the carrier.

Figure 4:
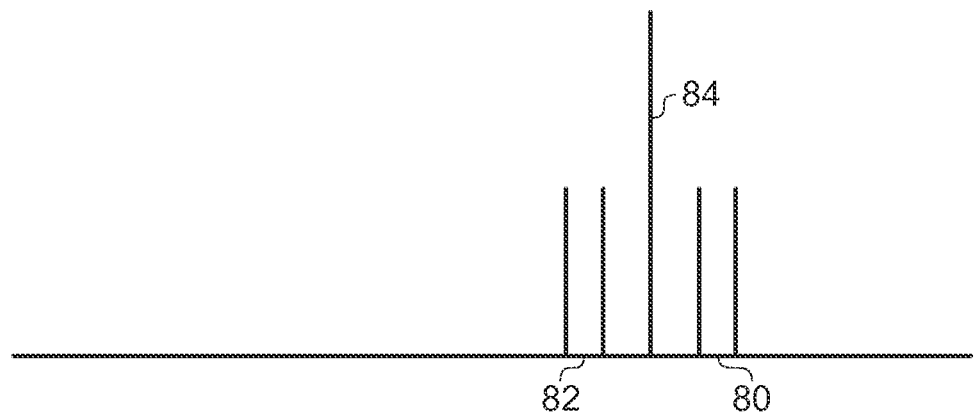
FIG. 4 illustrates the spectrum of a frequency shift keyed signal when used to modulate an RF carrier.

Representing the data by frequencies $M_0$ and $M_1$ has the effect of moving the return data, in the frequency domain, into sidebands positioned around the instantaneous carrier frequency. This is shown in FIG. 4 where upper 80 and lower 82 sidebands each have signals for "1" and "0" spaced 1.75 and 2.25 MHz away from a carrier 84.

Additionally, at the receiver harmonics (not shown) of the sidebands are received, together with carriers that are displaced in frequency because they were reflected from a reflector at a different distance from the radar.

These sidebands are unwanted as they have the potential to generate signals within the receiver that can interfere with a wanted signal.

Figure 5:
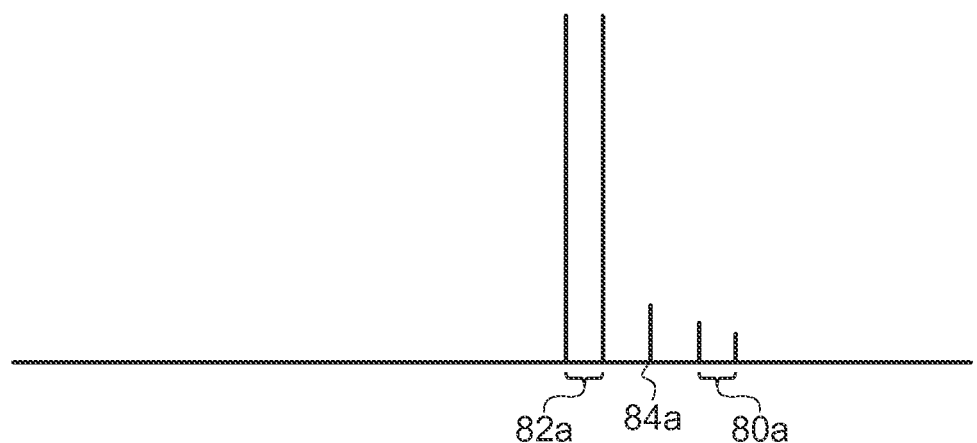
FIG. 5 illustrates the spectrum of FIG. 4 when a SSBSC modulator is used.

This is overcome in one embodiment of the invention by using a single sideband suppressed carrier modulation scheme. Ideally only one sideband is selected for transmission, although as shown in FIG. 5 in reality the carrier 84a and the upper sideband 80a can be significantly suppressed, say by 36 dB or so, compared to a lower sideband 82a.

Figure 6:
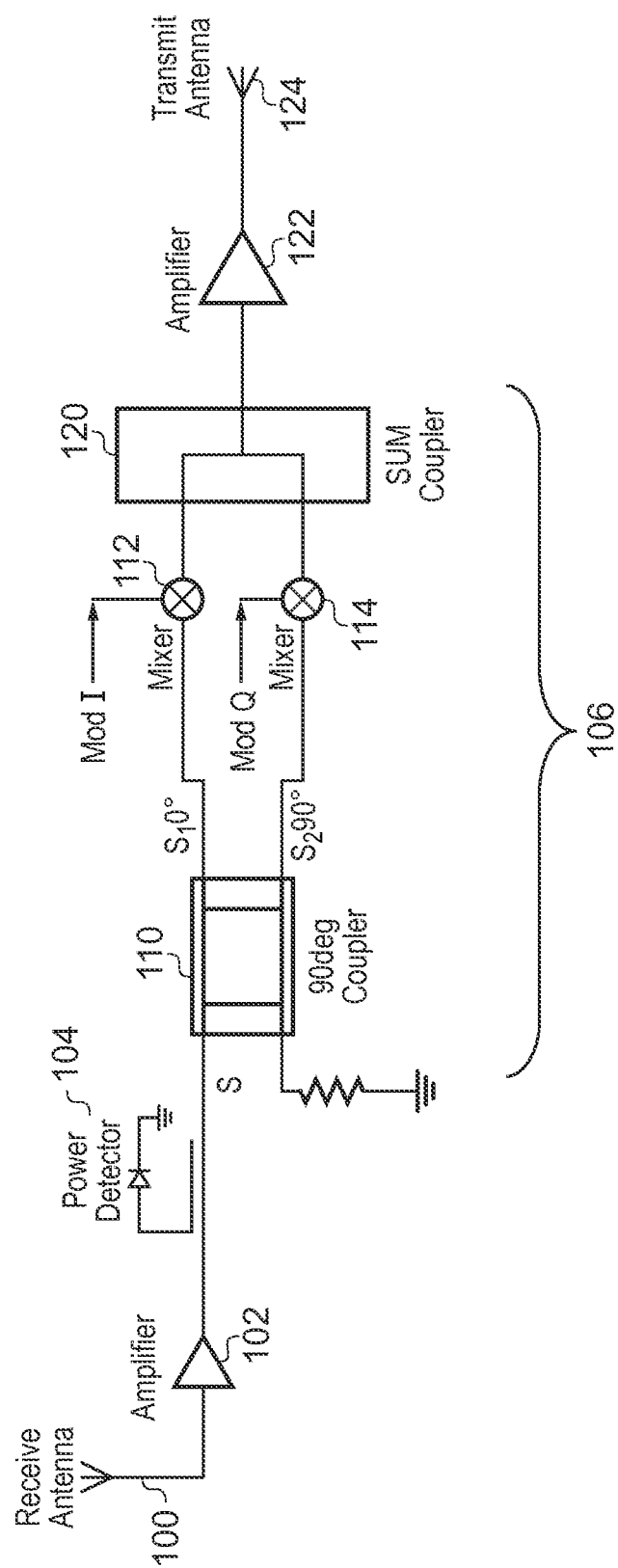
FIG. 6 illustrates a configuration of a SSBSC modulator in an active target constituting an embodiment of the present invention.

Several approaches are known for SSBSC modulation, although for microwave frequencies the phasing method implemented using a Hartley modulator is appropriate. An embodiment of a modulator in accordance with the present invention is shown in FIG. 6.

The modulator comprises a receive antenna 100 that provides an input to a first amplifier 102. A power detector 104 follows the amplifier 102 and forms part of a power control loop with the amplifier 102 so as to control the signal at the output the amplifier to lie with a target power range, and/or reduce power consumption when the active target is not being illuminated by a radar.

The amplifier output is provided as an input to a Hartley modulator 106. The Hartley modulator is well know to the person skilled in the art, but the following brief explanation is given to assist the reader. An input signal S is passed through a 90° coupler 110 which provides two output signals S1 and S2. S1 is in phase with S, i.e. has a 0° phase shift whereas S2 is shifted by 90°. Thus two signals out of phase are produced.

These can be represented as $$S1 = \sin W_m T$$

$$S2 = \cos W_m T$$

The signals S1 and S2 are provided to first inputs of balanced mixers 112 and 114. The mixers also receive in-phase and 90° shifted versions of the modulating signal, i.e. the 1.75 and 2.25 MHz signals generated by the circuit of FIG. 3. This can be achieved either by a phase shifting filter, or running the circuit at higher frequencies and then using dividers to divide down to the desired frequencies and to control the phases.

Thus the signal inputs, labelled "MODI" and "MODQ" are provided to the mixers 112 and 114 respectively.

$$MODI = \sin W_s T$$

$$MODQ = \cos W_s T$$

The outputs of the mixers are summed in a summing coupler 120.

The outputs of the mixers can be represented, using the trigonometric identities.

$$\sin A \cdot \sin B = \tfrac{1}{2}\cos(A-B) - \tfrac{1}{2}\cos(A+B)$$

$$\cos A \cdot \cos B = \tfrac{1}{2}\cos(A+B) - \tfrac{1}{2}\cos(A-B)$$

to give $$\begin{aligned}\text{output} &= 1/2\cos(W_m T - W_s T) - 1/2\cos(W_m T + W_s T) + \\ &\quad 1/2\cos(W_m T + W_s T) + 1/2\cos(W_m T - W_s T) \\ &= 1/2 LSB - 1/2 USB + 1/2 USB + 1/2 LSB \\ &= LSB\end{aligned}$$

The lower sideband signal is then amplified by a further amplifier 122 and then provided to transmit antenna 124, which may be a patch array.

Thus the modulation scheme in conjunction with the FSK or PSK encoding gives a frequency shift between the input and the output frequencies of at least 1.75 MHz, and also suppresses the carrier, thereby reducing the risk of self sustaining oscillation and enabling a higher gain to be applied by the amplifiers 102 and 122. The isolation can be further improved by using polarisation sensitive receive and transmit antennas and arranging for them to work with orthogonal polarisation states, e.g. vertically and horizontally linearly polarised radiation, but circular polarisations may also be used. Thus the receive antenna may be responsive to vertically polarised RF energy whereas the transmit antenna transmits horizontally polarised RF energy or vice versa.

Thus the active target can transmit an identity, and with increased gain, so as to help it stand out against other radar returns. Signal processing at the radar can be used to extract the target identity, thereby allowing multiple targets to be used, and potentially to be quite closely spaced.

Other Data

Returning to FIG. 1, it can be seen that the ship 4 has a "forward" direction in which it travels. Consequently to know about the dynamics of motion of the ship it is advantageous to know more than just the range to the ship. It is desirable to have other data such as the relative direction of the ship to the radar beam.

This can be achieved by measuring the angle of illumination that the incoming radar makes with the active target. This, combined with knowledge about placement of the target on the vessel allows the relative angle of the vessel to be determined.

There are several approaches that could be used, such as a mechanically swept narrow beam antenna; multiple fixed narrow bean antennas, each with a respective direction of look, or phased array synthesis of a narrow beam antenna.

A suitable approach is a phase comparative approach as this can be performed with a mixer.

Figure 7:
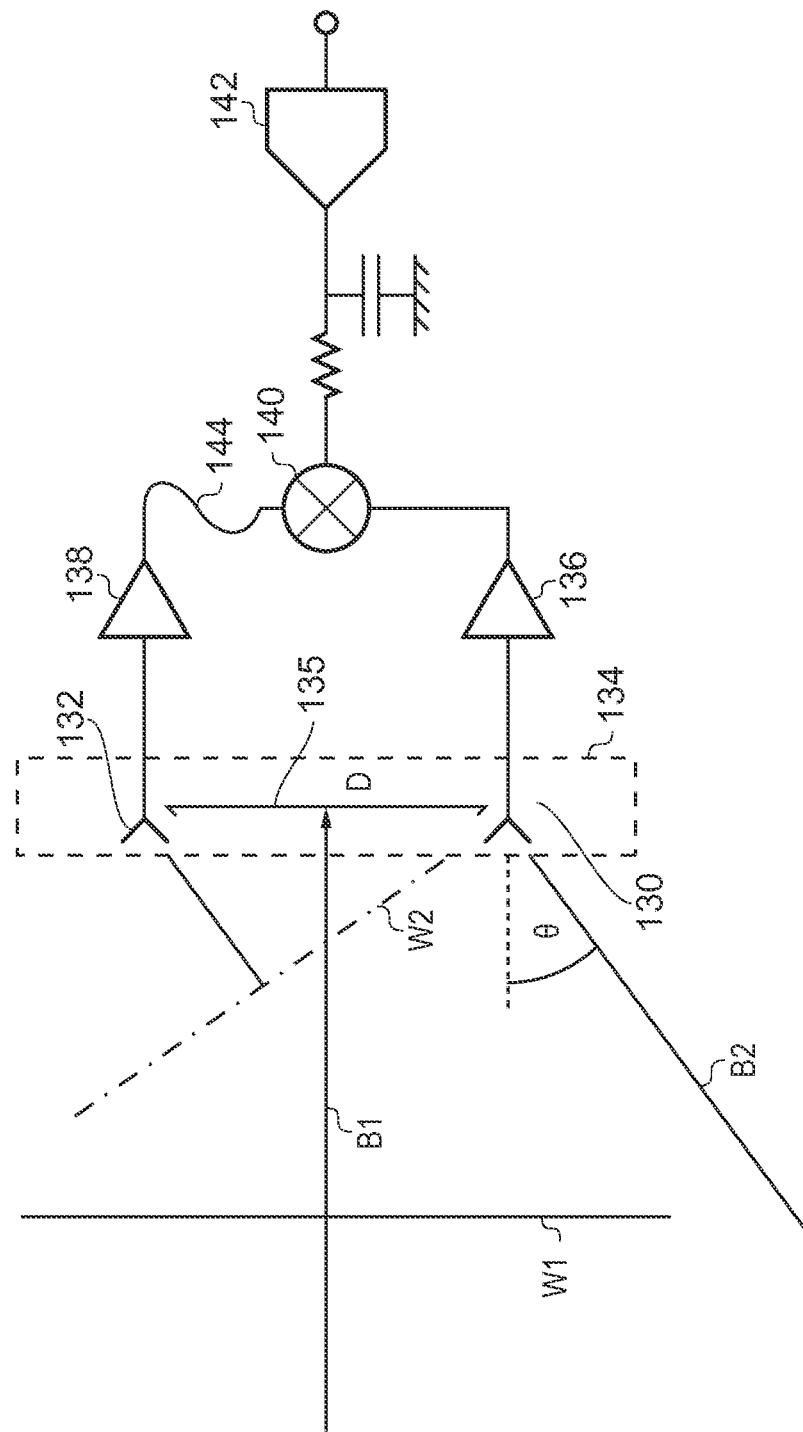
FIG. 7 illustrates an arrangement for measuring the azimuth of an incoming radar beam.

FIG. 7 illustrates an active target constituting an embodiment of the invention and comprising first and second receive antennas 130 and 132 that are spaced apart by a known distance D within a housing 134. Although the drawing is schematic, the housing is shown to highlight that the target can be relatively thin, i.e. be quite planar, and hence easy to attach to surfaces.

If the incoming radar beam is normal to the plane 135 containing the antennas 130 and 132, as illustrated by beam B1, then a notional wave front arrives at both antennas at the same time. Hence the phases of the signals output by the antennas are identical.

However if an oblique beam B2 illuminates the active reflector then, as shown, a notional wave front W2 arrives at antenna 130 before it arrives at antenna 132. This gives rise to an extra "time of flight" which is proportional to the distance D and the sine of the angle of illumination θ.

This in turn gives rise to a phase charge which depends on the wavelength of the radiation used by the radar.

As shown the output of each antenna is provided to a respective amplifier 136, 138 which advantageously both amplifies and limits the signal amplitude. The outputs of the amplifiers are then provided to a mixer 140 which multiplies the signals together, forming a sum frequency, and more importantly a difference frequency which is a DC representation of the phase difference, and which is digitised by a digital to analog converter 142. The DAC output can be placed in a data word and retransmitted to the radar, using the circuit shown in FIG. 3.

Returning to FIG. 7, we have a choice of whether the normal illumination gives a maximum or a minimum in the output signal of the mixer 140.

If a maximum is required, then all the path lengths are matched within the receiver, or differ from each other by a multiple of λ/2 where λ is the wavelength of the radar used to illuminate the target. If however we want a null, then an additional path length of λ/4 (or 3, 5, 7, 9 etc λ/4) as indicated by 144 can be inserted into one of the signal paths.

Other path delays could be selected, such as λ/8 so that the signal from the mixer would be ½ amplitude for radio waves arriving perpendicular to plane 135, and would increase if, for example, the beam swings towards the first receive antenna 130, and would decrease if the beam swings towards the second antenna 132. Thus angle and direction can be resolved simultaneously.

The antennas 130 and 132 are, advantageously, provided at the same height as each other to simplify installation. However this requirement can be relaxed and the antennas provided at different heights (so they can participate in providing height diversity) when amplitude limiting is performed by the amplifiers 136 and 138.

Signal Path Diversity

The radar beam travelling to a target and/or the signal returning may, in fact, comprise multiple signals travelling via dissimilar paths. Thus one portion of the signal may travel directly to the target whilst another portion may reflect from the surface of the sea. The signals interfere with one another, and the interference may be constructive or destructive depending on the relative path lengths.

Destructive interference may cause a return from the target to disappear. In order to address these multiple effects it is desirable to add diversity to the active target. The diversity may be one or more of a distance diversity, and a height diversity. If it is desired to keep the reflector "thin", then height diversity is preferred and hence a second receive and a second transmit antenna are provided, vertically displaced (and optionally horizontally displaced) from the first transmit and receive antennas. In other configurations one of the receive or transmit antennas may be omitted, although this does allow destructive interference in one of the paths between the interrogating radar and the active target to effect the performance of the system compared to providing multiple receive and multiple transmit antennas.

This could be done with two physically separate active targets, but this does not allow synergies to occur from building height diversity into a single unit. The single unit approach allows the height diversity to be controlled to a sensible range as defined by the case of the active target to around 0.5 to 1 meter. Furthermore the antennas can share the same target identity, and can return the same additional data.

The returns from the antennas can be frequency or time multiplexed in order that they themselves do not interfere.

Frequency multiplexing can occur by choosing different modulation frequencies to represent the "1"s and "0"s of the digital identity. Thus in the arrangement described hereinbefore the frequencies of 1.75 and 2.25 MHz can be regarded as being centred around 2 MHz. For the second antenna frequencies of 2.5 and 3 MHz may be chosen, giving signals centred around 2.75 MHz.

Alternatively the antennas can be operated in a time multiplexed mode such that for a while the first transmit antenna is active, but the second transmit antenna is not, and then the second transmit antenna is active, but the first is not. This swapping is repeated in a cyclical manner.

Finally a time delay in retransmit times—which could simply comprise an additional path length of several meters or 10's of meters can be added to one of the antennas. The delay may simply be a predetermined length of cable. This causes the returns to appear to come from different ranges, and hence stops them interfering with each other as they have different instantaneous frequencies.

Figure 8:
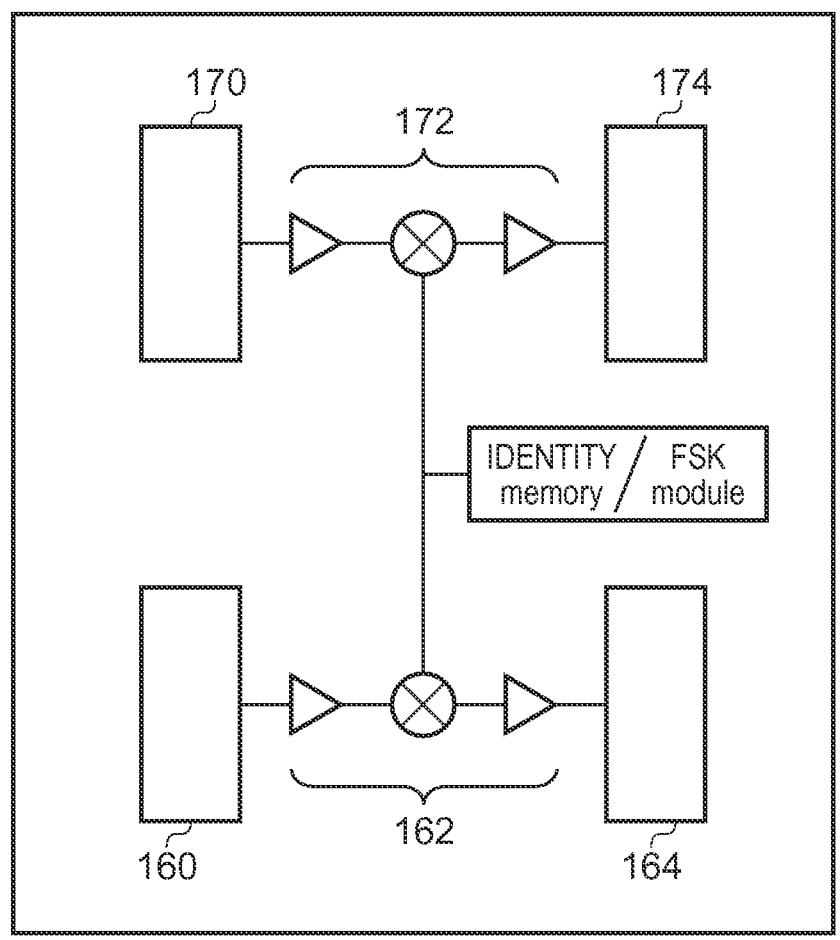
FIG. 8 illustrates an embodiment of the present invention incorporating two receive/transmit channels at different heights.

FIG. 8 schematically illustrates an active target in which signal path diversity is provided by having two separate receive and transmit channels physically separated from one another. Thus a first channel comprises a patch antenna 160, amplifiers and single sideband suppressed carrier modulators within a block 162 vaguely corresponding to components 102, 106 and 122 of FIG. 6 and a transmit antenna 164. A second channel comprises receive antenna 170, an amplification and modulation block 172 and a transmit antenna 174. Both channels share the same identity memory and frequency shift keying circuit, for example as shown in FIG. 3, albeit with a further frequency translation being applied to the second channel, such that they transmit the same data but at slightly different frequencies. It therefore becomes much more unlikely that both channels will simultaneously suffer degradation due to destructive interference as a result of multiple propagation paths. Additional transmit or receive antennas may be added to further reduce the potential for destructive interference to adversely impact on operation of the radar ranging system.

Figure 12:
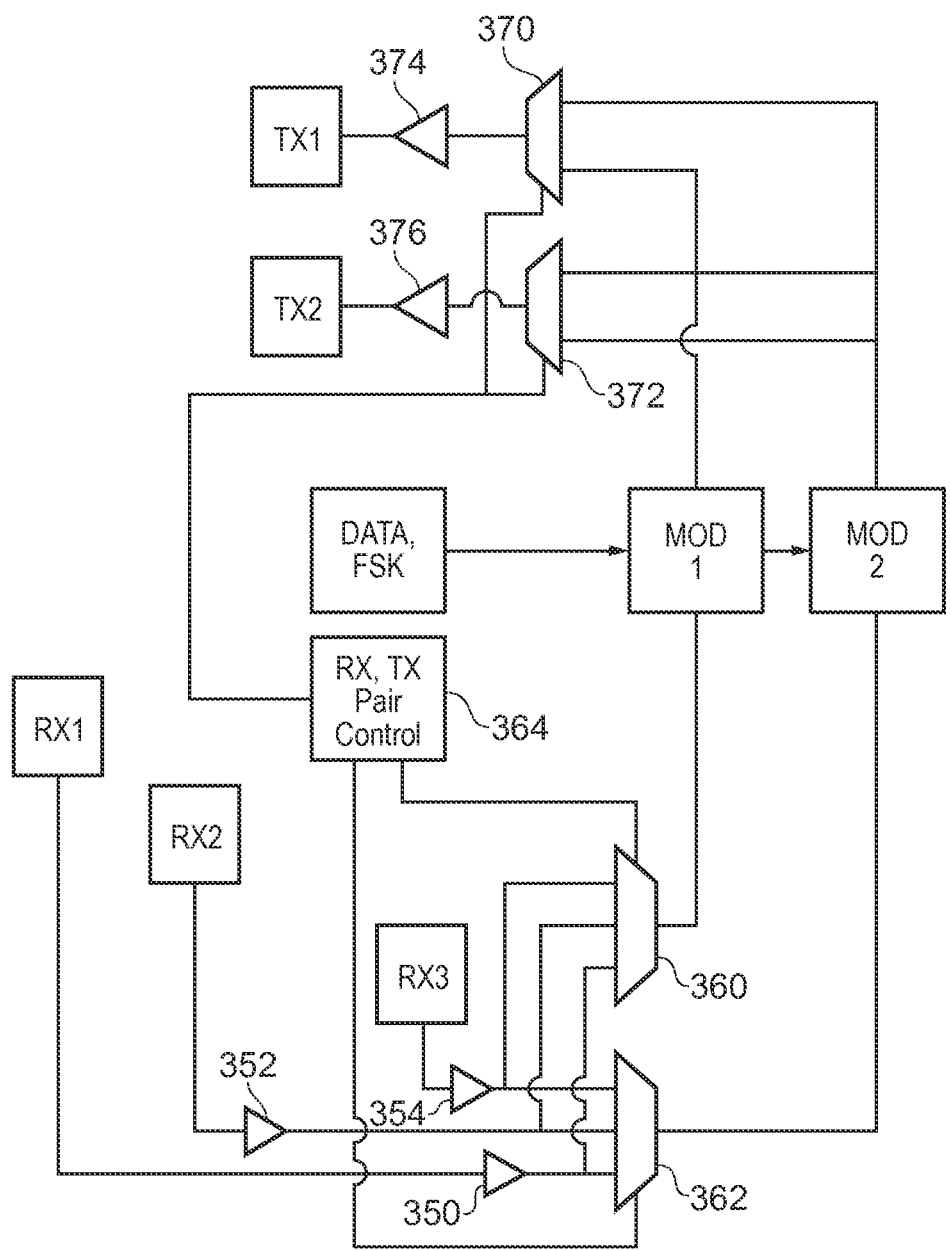
FIG. 12 illustrates an embodiment with multiplexed height diversity.

In the arrangement shown in FIG. 8 each of the receive antennas is uniquely associated with a transmit antenna. This association need not be permanent and, for example, a multiplexer or other cross coupling circuit can be provided to change the connections on an automated basis such that sometimes receive antenna 160 is in a signal path that leads to transmit antenna 164 and at other times the receive antenna 160 is associated with the transmit antenna 174. FIG. 12 shows, in schematic form, a further embodiment where the number of receive antennas and transmit antennas are dissimilar and where time division multiplexing is used to vary the association between input antennas and output antennas.

In the arrangement shown in FIG. 12 three receive antennas RX1, RX2 and RX3 are provided each at a different height, as schematically indicated in FIG. 12 by them being vertically displaced from one another. The horizontal spacing between the receive antennas may also vary, as the antennas may be used as part of the beam angle measurement system disclosed hereinbefore and different separations allow different angular sensitivities to be obtained. Each of the antennas RX1, RX2 and RX3 provides its signal to an associated amplifier 350, 352 and 354, the outputs of which are connected to first and second multiplexers 360 and 362. Each of the multiplexers 360 and 362 is responsive to a receive and transmit antenna pair control unit 364 which selects signals from the receive antennas, RX1, RX2 and RX3 to be supplied to a first modulator or a second modulator. The same or different input signal may be supplied to each of the modulators, labelled MOD1 and MOD2. Each modulator may also receive a data payload encoded by frequency shift keying as described hereinbefore with respect to FIG. 3. The modulators MOD1 and MOD2 are preferably single sideband suppressed carrier modulators of the type generally designated 106 in FIG. 6. The output of each modulator MOD1 and MOD2 is provided to two further multiplexers 370 and 372 which can select the modulator outputs for output to amplifiers 374 and 376 which are themselves connected to transmit antennas TX1 and TX2 which are again disposed at different heights, as schematically illustrated by transmit antenna TX1 being illustrated above transmit antenna TX2. Thus in this arrangement there are six possible height combinations which can be selected in a time multiplexed manner with two different height combinations being active concurrently. It is thus possible to provide height diversity such that destructive interference in the path from the radar to the receive antenna or in the path from the transmit antenna to the radar does not cause the data payload from the active target to become lost.

Figure 9:
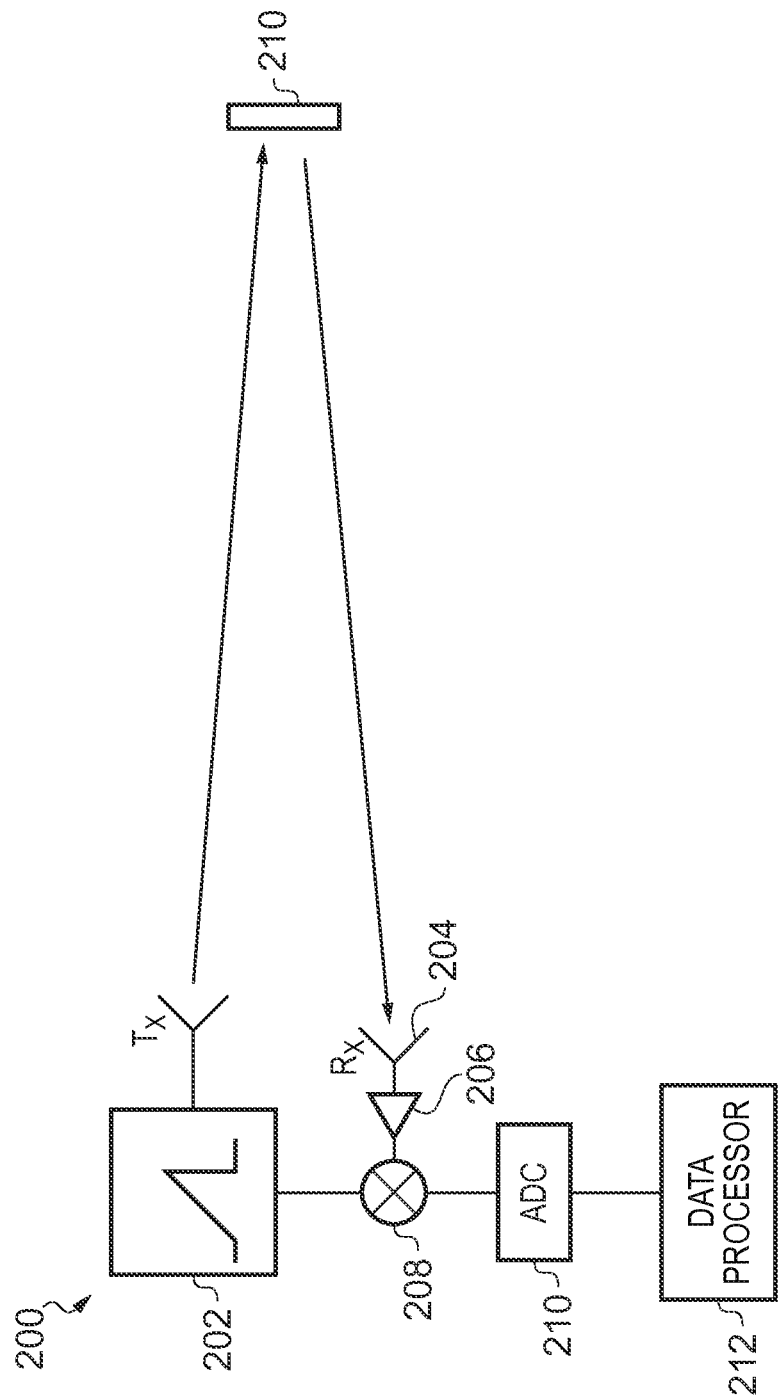
FIG. 9 schematically illustrates a radar system operating in accordance with the present invention.

FIG. 9 schematically shows a radar ranging and positioning system in which a radar, generally designated 200 comprises a chirped frequency source 202 which provides radio frequency energy, generally in the radar X band (wavelength=3 cm), or in similar sub 25 cm wavelengths. The radar signal is transmitted towards an active target 210 constituting an embodiment of the invention. As discussed hereinbefore the target amplifiers, modulates and returns the radar signal and the return signal is received by a receive antenna 204, amplified by an amplifier 206, and mixed with the output of the transmit oscillator 202 by mixer 208 to get a beat frequency which is then digitised by an analog to digital converter 210 and provided to a data processor 212. The data processor 212 is adapted to calculate the range to the target based on the beat frequency, but further to take into account further frequency translations as a result of the frequency shift keying scheme introduced at the active target in order to modulate the signal being returned to the radar 200. The data processor is also arranged to analyse the digitised signal to look for signal patterns representative of the target identity, and further data which may also be modulated onto the radar signal. Where the further data may be any one of a plurality of data types a header is advantageously attached to the data in order to signify the type of data that follows the header.

In the height diversity embodiments described thus far a single identity has been transmitted. However, it is also possible for the pairings of receive and transmit antennas to be arranged to transmit respective identities, rather than the same identity. Advantageously the respective identities are related to one another such that the task of setting up the respective identities is simplified. Thus, for example, where an identity is programmed in to one channel of active target having height diversity, the other identity may be generated automatically from the first identity.

Height diversity may also be provided in the radar 200. Generally the radar system has a rotating transmit antenna and a rotating receive antenna in synchronism with the transmit antenna. Additional receive or/and transmit antennas can be provided, and the transmit antennas may, for example, be driven in a time multiplexed manner. Signals received at the receive antennas may be selected on the basis of whichever signal is strongest, or could be selected in an alternating fashion. Alternatively each received signal may be down converted individually and then the signals combined in a non-destructive manner.

Figure 11:
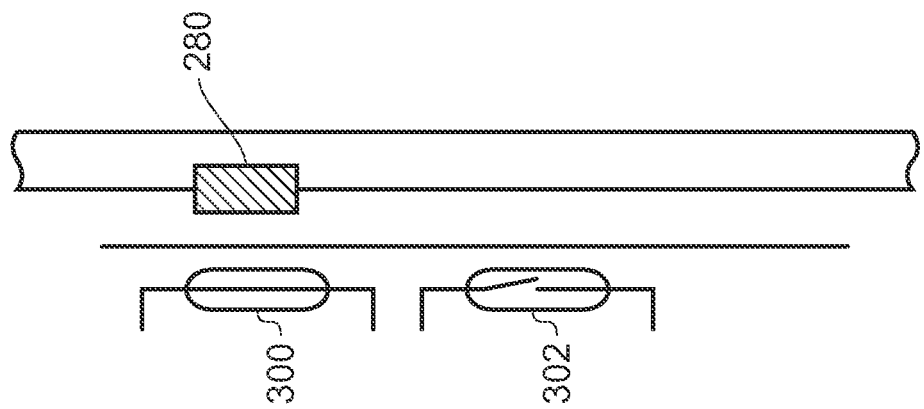
FIG. 11 shows the magnetic input of FIG. 10 in greater detail.
Figure 10:
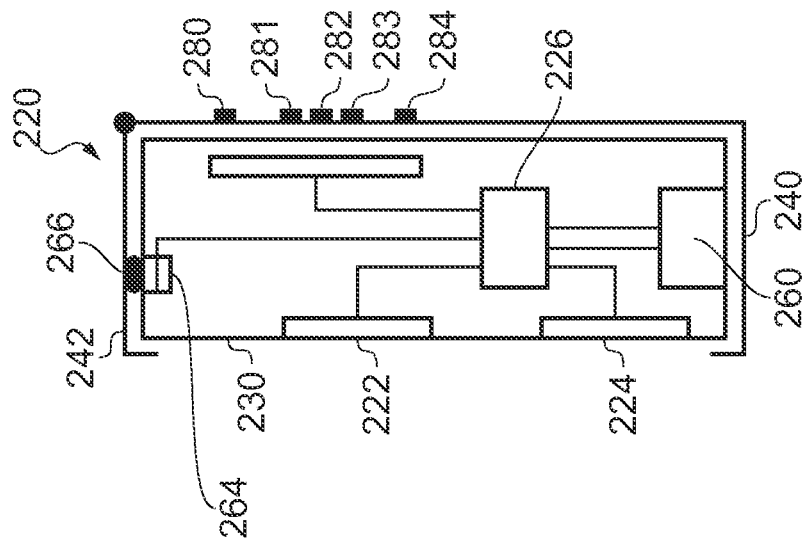
FIG. 10 illustrates a further embodiment of the invention.

In the embodiment of the active target described with respect to FIG. 3, the identity of the active target was held within register 40. In some instances it may be preferable for the identity of the active target to be held by a mounting bracket for the target rather than the target itself. This means that, where the target is battery powered, a target who's batteries are becoming depleted may be removed from a mounting bracket and a new target with fresh batteries attached to the mounting bracket. Once the new target is attached it takes the same identity as the target that has just been removed because that identity is passed to it from the mounting bracket. Such an arrangement is schematically illustrated in FIG. 10 where an active target 220 comprises receive and transmit antennas 222 and 224, respectively, co-operating with a modulator 226 and enclosed within a case 230. The case is selectively mountable and demountable inside a mounting frame 240 which in this example is shown having a hinged lid 242 such that the active target 220 can be quickly but securely fixed within the frame. The active target includes a battery 260 which powers the active target. This has the advantage that no external power needs to be routed to the target, but has the disadvantage that the target will need maintenance from time to time in order to replace the battery, which might be done simply by swapping out the active target with a new one. In order to facilitate this the active target includes means for receiving its target identity. In the embodiment shown the active target includes a tag reader 264, such as an RF ID tag reader which is positioned such that it would be able to interrogate a corresponding RF ID tag 266 located in the bracket. This has the advantage of protecting the RF ID tag from being lost although similarly the RF ID tag, or some other removable memory device could be attached to the active target around the time that it is installed on the bracket. An alternative approach might be to include an array of magnets 280 to 284 whose presence, or absence, with respect to a corresponding magnetic switch, such as a read relay, allows the target identity to be passed to the active target. This arrangement is shown in more detail in FIG. 11 where magnet 280 aligns with an associated reed relay 300 in the active target causing the reed relay to close whereas a further reed relay 302 aligns with the gap between magnets 280 and 281 and therefore remains open. It can therefore be seen that by suitable positioning of the magnets with respect to the relay positions a digital identity can be easily and robustly passed between the mounting bracket and the active target.

It is thus possible to provide an improved active target, and a radar system which can benefit from the augmented information that can be returned by the active target.

What is claimed is:

1. An active radar target comprising a plurality of antennas comprising a plurality of receive antennas and a plurality of transmit antennas arrangeable into pairs of transmit and receive antennas, each pair comprising a transmit antenna and a receive antenna the active radar target further comprising a first amplifier and a first modulator arranged to amplify and modulate an incoming signal prior to retransmitting it, wherein at least one antenna in one of the pairs of transmit and receive antennas is vertically displaced with respect to at least one antenna in a different one of the pairs of transmit and receive antennas and wherein the pairings are alterable in an automated manner.

2. An active radar target as claimed in claim 1, in which multiplexers responsive to a controller change the antenna pairings.

3. An active radar target as claimed in claim 1, where at least three antennas in the plurality of antennas are vertically displaced with respect to one another.

4. An active radar target as claimed in claim 1, where all of the antennas in the plurality of antennas are vertically displaced with respect to one another.

5. An active radar target as claimed in claim 1, in which the first amplifier and the first modulator are provided in a first channel, and a second amplifier and a second modulator are provided in a second channel, and the first channel processes a signal for a first receive antenna and transmit antenna pair, and the second channel processes a signal for a second receive antenna and transmit antenna pair.

6. An active radar target as claimed in claim 1, in which the first modulator is configured to frequency shift an output signal away from the input signal.

7. An active radar target as claimed in claim 6, in which the first modulator is configured to frequency or phase shift encode data onto the signal or some of the signals transmitted by each transmit antenna.

8. An active radar target as claimed in claim 7, in which the data includes one or more of: (i) an identity code, (ii) data provided by external equipment, and (iii) an estimate of relative direction of the incoming radar signal.

9. An active radar target as claimed in claim 1, in which the target has a detector for detecting when the target is illuminated by a radar signal above a predetermined intensity, and the target is adapted to energise the first amplifier and the first modulator in response to being illuminated by the radar signal above the predetermined intensity.

10. An active radar target as claimed in claim 1, further including a direction detector for detecting a direction of an illuminating radar signal with respect to the active target.

11. An active radar target as claimed in claim 10, in which the direction detector comprises first and second antennas and a phase detector for detecting the relative phases of signals arriving at the first and second antennas.

12. An active radar target as claimed in claim 1, in which the receive and transmit antennas are configured to receive and transmit, respectively, orthogonally polarised radar signals.

13. A radar system in combination with an active radar target as claimed in claim 1.

14. A radar system as claimed in claim 13, wherein the radar system further includes at least one of: (i) two or more receive antennas from the plurality of receive antennas, the two or more receive antennas being vertically displaced with respect to one another, and (ii) two or more transmit antennas from the plurality of transmit antennas, the two or more transmit antennas being vertically displaced with respect to one another.

* * * * *